No. 843,915. PATENTED FEB. 12, 1907.
N. B. STONE.
TURPENTINE HACK.
APPLICATION FILED MAY 29, 1906.

2 SHEETS—SHEET 1.

Nathaniel B. Stone, Inventor,

By E. G. Siggers

Witnesses
Howard D. Ort.
B. G. Foster

Attorney

THE NORRIS PETERS CO., WASHINGTON, D. C.

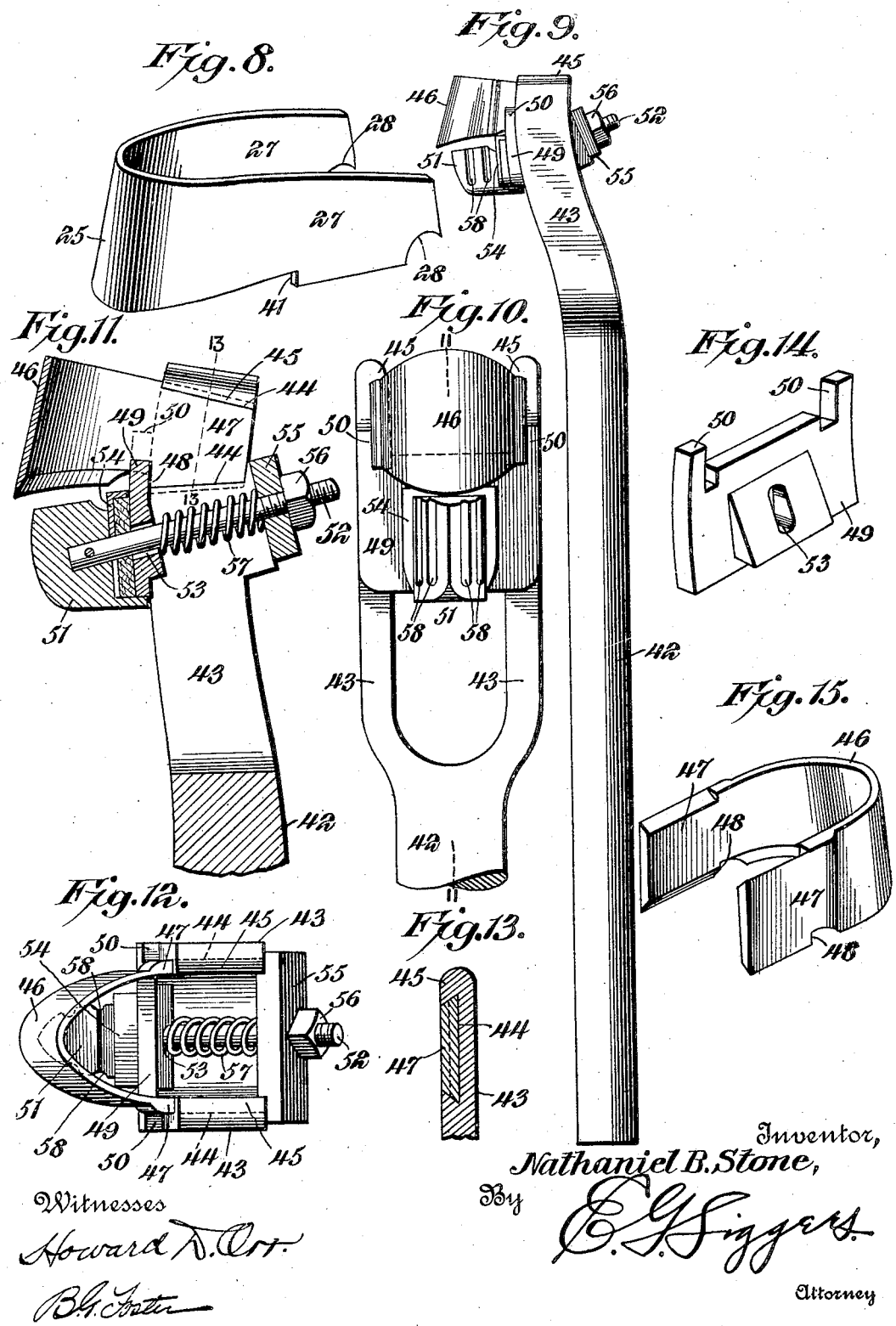

UNITED STATES PATENT OFFICE.

NATHANIEL B. STONE, OF OUTLOOK, WASHINGTON.

TURPENTINE-HACK.

No. 843,915.  Specification of Letters Patent.  Patented Feb. 12, 1907.

Application filed May 29, 1906. Serial No. 319,321.

*To all whom it may concern:*

Be it known that I, NATHANIEL B. STONE, a citizen of the United States, residing at Outlook, in the county of Yakima and State of Washington, have invented a new and useful Turpentine-Hack, of which the following is a specification.

This invention relates to means for scoring or hacking trees for the purpose of bleeding them to secure the resinous gums and the like.

One of the principal objects is to provide a simple structure that is effective in its operation and is exceedingly convenient to handle.

Another object is to provide an implement of the above character with a removable blade that can be readily sharpened or replaced by a new one and to provide means that will properly hold and reinforce said blade when the same is in position, so that the blade may be comparatively thin and danger of its displacement or injury is avoided.

A still further object is to provide an implement of the above character with novel gage mechanism whereby the depth of cut can be readily controlled, so as to avoid unnecessary injury to the tree.

Two embodiments of the invention are illustrated in the accompanying drawings, wherein—

Figure 1:
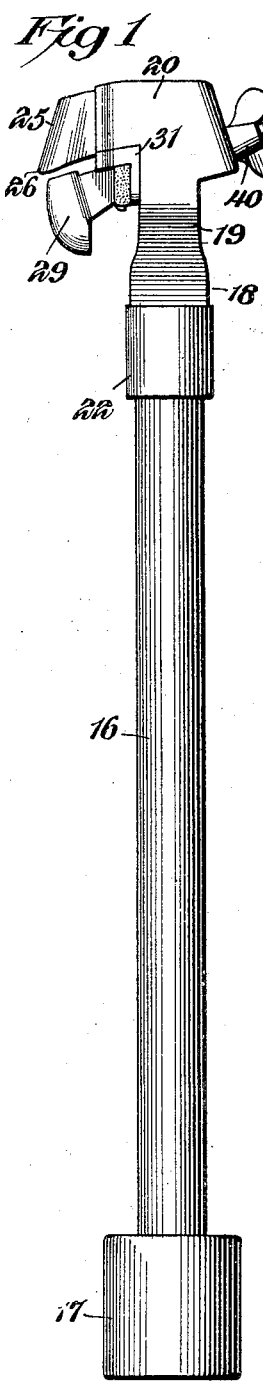
Figure 3:
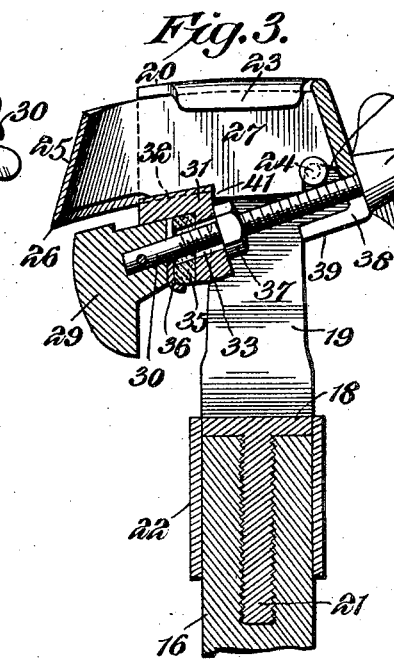
Figure 2:
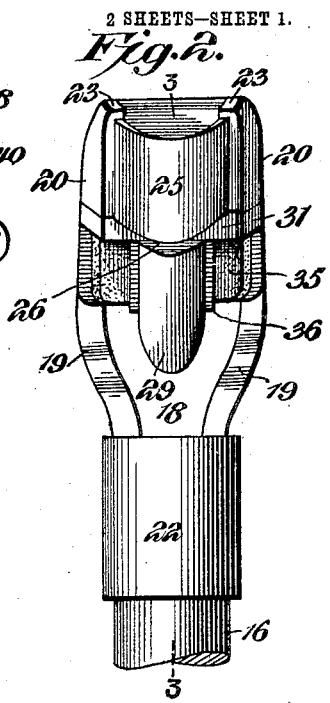
Figure 4:
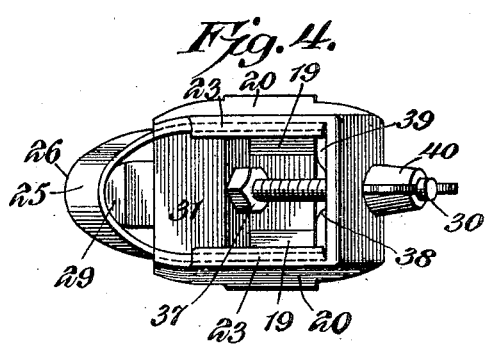
Figure 7:
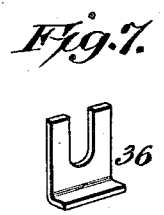
Figure 5:
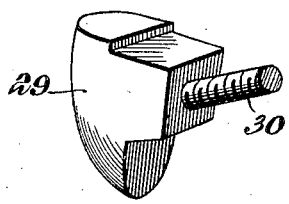
Figure 6:
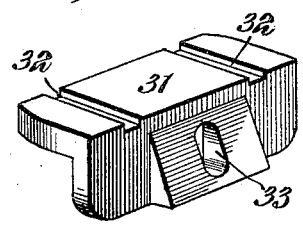

Figure 1 is a side elevation of one form of construction. Fig. 2 is a front elevation of the upper portion of the cutting mechanism. Fig. 3 is a longitudinal sectional view on the line 3 3 of Fig. 2. Fig. 4 is a plan view. Fig. 5 is a detail perspective view of the gagehead. Fig. 6 is a detail perspective view of the cross-bar. Fig. 7 is a detail perspective view of the removable washer. Fig. 8 is a detail perspective view of the cutting-blade. Fig. 9 is a side elevation of a modified form of construction. Fig. 10 is a front elevation of the head thereof. Fig. 11 is a longitudinal sectional view on the line 11 11 of Fig. 10. Fig. 12 is a top plan view of the structure. Fig. 13 is a detail sectional view on the line 13 13 of Fig. 11. Fig. 14 is a detail perspective view of the cross-bar, and Fig. 15 is a detail perspective view of the cutting-blade employed in the modified form of construction.

Similar reference-numerals designate corresponding parts in all the figures of the drawings.

Referring to the embodiment disclosed in Figs. 1 to 8, inclusive, a support is employed comprising a handle 16, which in this embodiment is preferably made of wood and has at one end a suitable weight 17. Projecting longitudinally from the other end of the handle is a yoke 18, the same including longitudinally-disposed side arms 19, that are spaced apart and have transversely-arranged heads 20 at their free ends. The yoke may be fastened to the handle in any suitable manner. For instance, in the present embodiment a screw-shank 21 is shown, which is threaded longitudinally into the end of said handle, the adjacent portions of the handle and yoke being surrounded by a suitable ferrule 22. The heads 20 are provided at their outer ends with inturned lips 23, and said heads furthermore have suitable inwardly-projecting studs 24. A substantially U-shaped cutting-blade is employed, the curved portion 25 thereof being dished, as shown, and having a sharpened cutting edge 26. The terminal portions of the blade are in the form of side arms 27, that fit between the heads 20 of the yoke and engage the inner faces of said head. It will be observed that the distance between the side arms is greater than the distance between the side of the blade portions directly adjacent to the cutting edge, so as to leave sufficient room for the free and unobstructed passage of the chips cut by the blade. The side arms 27 have their rear edges abutted against the lips 23 and are furthermore provided with cut-away portions 28, that receive the studs 24. Associated with the cutting-blade and located in front of the same is a gage comprising a head 29, the outer face of which is curved, as shown, said head having a blunt end arranged adjacent to the cutting-blade and having its opposite end tapered, as clearly shown. This head is narrower than the space between the side arms of the blade and is provided with a threaded shank 30, that extends between and transversely of the arms 19. A cross-bar 31, that is angular in cross-section, rests against the edges of the side arms 19 and has seats 32 to receive said edges. This cross-bar has a slot 33 therethrough, through which the shank passes. A cushion 35 may be interposed between the head and cross-bar, and a removable washer 36 is also interposed between the said cross-bar and head. A nut 37 is screwed upon the shank and abuts against the rear side of the cross-bar, thus clamping the associated parts together. The shank also extends through a slot 38, formed in a transverse web 39, that connects the rear ends of the heads 20 of the yoke, and a clamping-nut 40, screwed upon the shank, engages the web. By referring particularly to Fig. 8 it will be observed that the inner edges of the side arms 27 of the blade have shoulders 41, and by referring to Fig. 3 it will be seen that the cross-bar 31 engages over these shoulders, and thus when the gage is in position and clamped the said cross-bar thereof constitutes means for retaining the cutting-blade in place.

The hack is operated in the ordinary manner; but it will be apparent that with this device no particular skill is necessary in the scoring of trees, inasmuch as the width of the cut is controlled by the width of the blade and the depth thereof is controlled by the gage. This depth can be readily varied by adding or removing washers corresponding to 36, the effect being to place the gage at different distances from the cutting edge. It will be observed that the blade is readily detachable. To remove said blade, it is only necessary to remove the gage and draw the cutting portion of the blade forwardly, whereupon the side arms will be disengaged from the lips and studs and will slip easily from between the arms of the yoke. This detachability of the cutting-blade is an important feature, for it permits the formation of said blade from sheet metal and also allows it to be readily removed and sharpened. Moreover, when the blade becomes worn it may be replaced by a new one without the necessity of an entirely new hack. Particular attention is invited to the effective manner in which the blade is secured in position. It will be observed that the side arms are engaged practically down to the cutting-point and are thoroughly strengthened and reinforced. The result is that a comparatively thin blade may be employed, yet there is little danger of its becoming injured or displaced. It will also cut freely, and the chips will pass without hindrance through the head.

A slightly different form of construction and yet one embodying practically all the advantageous features of the form above described is illustrated in Figs. 9-15, inclusive. In this form the support consists of a metallic handle 42, which is heavy enough to do away with the necessity of having an additional device corresponding to the part 17 of Fig. 1. This handle has at one end an integral yoke comprising longitudinally-disposed arms 43. The inner sides of the arms are provided with tapering dovetailed recesses 44, so that the outer ends of said arms are thus provided with overhanging transversely-disposed lips 45. The cutting-blade 46 is substantially U-shaped and has side arms 47 thickened and arranged to fit in the dovetails 44, the said side arms also having notches forming shoulders 48. A cross-bar 49, that bridges the space between the side arms, engages against the shoulders 48 and has tongues 50, that extend transversely of the outer faces of the side arms 47. A gage-head 51 is associated with the cutting-blade and has a shank 52, that passes through a slot 53 in the cross-bar 49. Suitable removable washers 54 are interposed between the head and the cross-bar 49. A web 55, which in this case is a separate element from the arms 43 of the yoke, extends transversely across the same on the opposite side to the cross-bar 49, and the shank 52 of the gage-head passes through said web, being provided with a clamp-nut 56, that bears against the same. A spring 57 is preferably interposed between the web and cross-bar, being thus housed within the yoke. The gage-head 51 is provided with longitudinal channels 58 in its opposite side faces. These channels form passage-ways for the accumulated pitch, and the ribs formed between said channels or passage-ways will cut through said pitch to the wood, thus properly gaging the knife or blade with respect to the wood and not to the material that covers the same. It will be evident that this structure is not only more simple than that first described, but has all the advantages of the same.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus fully described my invention, what I claim as new, and desire to secure by Letters Patent, is—

1. In a device of the character described, the combination with a handle, of a yoke carried thereby and comprising side arms having spaced ends, and a cutting-blade bridging the space between the side arms and having side arms engaged therewith.

2. In a device of the character described, the combination with a handle, of a yoke carried thereby and comprising side arms disposed longitudinally of the handle and having spaced outer ends, and a substantially U-shaped cutting-blade disposed transversely of the arms and bridging the space between the same, said blade having spaced side arms engaged with the side arms of the yoke.

3. In a device of the character described, the combination with a handle, of a yoke carried thereby and comprising side arms disposed longitudinally of the handle and having spaced outer ends, and a substantially U-shaped cutting-blade disposed transversely of the arms and bridging the space between the same, said blade having spaced side arms located against and interlocked with the inner sides of the arms of the yoke.

4. In a device of the character described, the combination with a handle, of a yoke carried thereby and comprising side arms having spaced ends provided with inset transversely-disposed lips, and a substantially U-shaped cutting-blade bridging the space between the side arms of the yoke, said blade having spaced side arms located against the inner sides of the yoke-arms and having their outer edges abutted against the lips.

5. In a device of the character described, the combination with a handle, of a yoke projecting therefrom and having longitudinally-disposed spaced side arms, said side arms being provided at their outer spaced ends with transversely-arranged heads, inset lips and studs carried by the heads, and a substantially U-shaped blade having side arms arranged between the heads and located against their inner sides, said side arms of the blades being engaged with the lips and studs.

6. In a device of the character described, the combination with a handle, of a substantially U-shaped cutting-blade having side arms connected to the handle, and a gage also connected to the handle and disposed in advance of the cutting-blade.

7. In a device of the character described, the combination with a handle, of a substantially U-shaped cutting-blade having side arms connected to the handle, and a gage-head connected to the handle and of less width than the blade.

8. In a device of the character described, the combination with a support, of a cutting-blade mounted on the support, a gage associated with the blade, and means for detachably connecting the gage to the support.

9. In a device of the character described, the combination with a support, of a cutting-blade mounted on the support, and a gage-head associated with the blade and having a shank connected to the support.

10. In a device of the character described, the combination with a support including a yoke having spaced side arms, of a cutting-blade having arms connected to the yoke, a cross-web connecting the arms, a gage associated with the cutting-blade and having a shank that passes through the web, and a holding-nut adjustably mounted on the shank.

11. In a device of the character described, the combination with a support, of a cutting-blade carried thereby, and a gage adjustably mounted on the support, said gage being associated with the blade and adjustable with respect to the same.

12. In a device of the character described, the combination with a support, of a substantially U-shaped cutting-blade carried by the support, and a gage mounted on the support and adjustable toward and from the outer portion of the blade.

13. In a device of the character described, the combination with a handle having a yoke comprising longitudinally-disposed arms, of a cutting-blade carried by the arms, a gage-head associated with the blade and having a shank that is adjustably associated with the arms, a cross-bar through which the shank passes, and a removable washer interposed between the head and cross-bar.

14. In a device of the character described, the combination with a support, of a cutting-blade detachably mounted thereon, and gage mechanism adjustably mounted on the support and coacting with the cutting-blade, said gage mechanism constituting retaining means for the blade.

15. In a device of the character described, the combination with a handle having a yoke, of a substantially U-shaped cutting-blade detachably mounted thereon and having side arms provided with offset shoulders, and gage mechanism associated with the cutting-blade and including a cross-bar that engages the shoulders of the side arms and constitutes means for securing the blades upon the handle-yoke.

16. In a device of the character described, the combination with a handle, of a yoke carried by one end of the same and comprising longitudinally-extending spaced side arms having inturned transversely-disposed lips at their outer ends, a substantially U-shaped cutting-blade having side arms disposed transversely of the yoke, said side arms being arranged against the inner sides of the yoke-arms and abutted against the lips, a gage-head located in advance of the cutting-blade and having a shank that extends transversely between the arms, and means engaging the arms and the shank for maintaining the gage in position.

In testimony that I claim the foregoing as my own I have hereto affixed my signature in the presence of two witnesses.

NATHANIEL B. STONE.

Witnesses:
 JOHN H. SIGGERS,
 S. GEORGE TATE.